US 9,898,268 B2
Feb. 20, 2018

(12) United States Patent
Craik et al.

(10) Patent No.: US 9,898,268 B2
(45) Date of Patent: Feb. 20, 2018

(54) ENHANCED LOCAL COMMONING

(71) Applicant: International Business Machines Corporation, Armonk, NY (US)

(72) Inventors: Andrew J. Craik, Ontario (CA); Patrick R. Doyle, Ontario (CA); Vijay Sundaresan, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 15/214,879

(22) Filed: Jul. 20, 2016

(65) Prior Publication Data

US 2018/0024823 A1 Jan. 25, 2018

(51) Int. Cl.
G06F 9/44 (2006.01)
G06F 9/45 (2006.01)

(52) U.S. Cl.
CPC .................. G06F 8/4434 (2013.01)

(58) Field of Classification Search
CPC ......... G06F 8/443; G06F 8/4441; G06F 8/441
USPC ....................................................... 717/152
See application file for complete search history.

(56) References Cited

U.S. PATENT DOCUMENTS

| 7,017,154 | B2 | 3/2006 | Haber et al. | |
| 7,516,448 | B1 | 4/2009 | Chan et al. | |
| 7,716,657 | B2 | 5/2010 | Inglis et al. | |
| 8,132,163 | B2* | 3/2012 | Tal | G06F 8/445 717/160 |
| 8,555,266 | B2 | 10/2013 | Copeland et al. | |
| 2006/0048115 | A1* | 3/2006 | Tal | G06F 8/445 717/151 |
| 2006/0048118 | A1* | 3/2006 | Archambault | G06F 8/443 717/151 |
| 2009/0138864 | A1* | 5/2009 | Tal | G06F 8/445 717/161 |
| 2010/0095271 | A1* | 4/2010 | Archambault | G06F 8/4442 717/110 |
| 2016/0070548 | A1* | 3/2016 | Gschwind | G06F 8/443 717/140 |

OTHER PUBLICATIONS

Escobar et al., Evaluation of GCC Optimization Parameters, Incio > vol. 3, No. 2 (2012), Retrieved from Internet: URL: http://www.revistas.usb.edu.co/index.php/IngUSBmed/article/view/272, 2 pages.

* cited by examiner

*Primary Examiner* — John Chavis
(74) *Attorney, Agent, or Firm* — Schmeiser, Olsen & Watts, LLP; Scott S. Dobson

(57) ABSTRACT

A method and system for enhanced local commoning optimization of compilation of a program. Commoning of volatiles within an extended block for a particular memory model associated with a particular programming language is performed, using a two pass approach. Within a first pass, a determination is made as to where in the program to evaluate volatile expressions that can be commoned. In a second pass, all remaining expressions that are not volatile expressions are commoned.

18 Claims, 11 Drawing Sheets code snippet 400

```
class VolatileExample {
  int x = 0;
  volatile boolean v = false;
  public void writer() {        402
    x = 42;
    v = true;
  }
  public void reader() {        404
    if (v == true) {
      //uses x - guaranteed to see 42.
    }
  }
}
```

FIG. 4 code snippet 600

```
private static class LazySomethingHolder {
  public static Something something = new Something();
}
public static Something getInstance() {
  return LazySomethingHolder.something;
}
```

FIG. 6

ENHANCED LOCAL COMMONING

TECHNICAL FIELD

The present invention relates generally to program code optimization in a data processing system and more specifically to local commoning optimizations in the data processing system.

BACKGROUND

One of the standard compiler optimizations is a technique of local commoning. In this particular optimization, the compiler aims to reuse an already computed value in a register instead of redoing the computation within the scope of an extended basic block. This reuse can only be performed safely when the register being reused contains the same value as would have been produced if the expression pertaining to the computed value had been evaluated. In addition to typical constraints, including checking for kills and other constraints, that must be checked to perform local commoning for non-volatile variables, there are additional constraints that must be checked to common volatile variables.

Compiler optimization of volatile fields in a managed runtime environment, including Java®, is subject to more constraints than non-volatile fields. The reason for additional constraints is because volatile variables accesses act as both memory barriers and loads or stores of memory.

SUMMARY

The present invention provides a method, and associated computer system and computer program product, for enhanced local commoning optimization of compilation of a program. one or more processors of a computer system perform commoning of volatiles within an extended block for a particular memory model associated with a particular programming language, using a two pass approach by: the one or more processors determining, within a first pass, where in the program to evaluate volatile expressions that can be commoned; and the one or more processors commoning, in a second pass, all remaining expressions that are not volatile expressions.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

FIG. 4 depicts a textual representation of a code snippet of a program, in accordance with embodiments of the present invention.

FIG. 6 depicts a textual representation of a code snippet of a program, in accordance with embodiments of the present invention.

DETAILED DESCRIPTION

Figure 1:
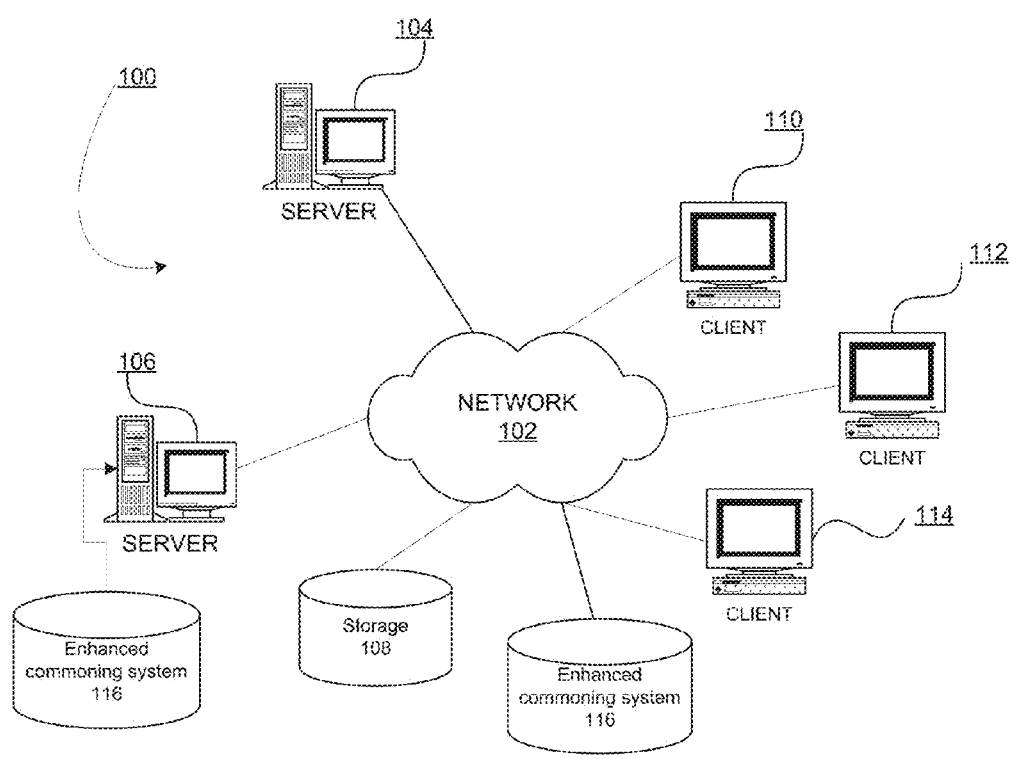
FIG. 1 depicts a pictorial representation of a network data processing system in which illustrative embodiments of the present invention may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention improves functioning of a computer, by improving optimization of compiling a program executable, or being executed, by one or more processors of the computer. FIG. 1 depicts a pictorial representation of a network a data processing system 100 in which illustrative embodiments of the present invention may be implemented. Network data processing system 100 is a computer system comprising a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown. Enhanced commoning system 116 is an example of using an enhanced compiler in a Java virtual machine environment providing optimization capabilities according to an embodiment of the present invention.

In FIG. 1, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, including thousands of commercial, governmental, educational and other computer systems that route data and messages. Network data processing system 100 also may be implemented as a number of different types of networks, such as for example, an intranet, a local area network (LAN), or a wide area network (WAN). FIG. 1 is intended as an example network data processing system, and not as an architectural limitation for the different illustrative embodiments.

Figure 2:
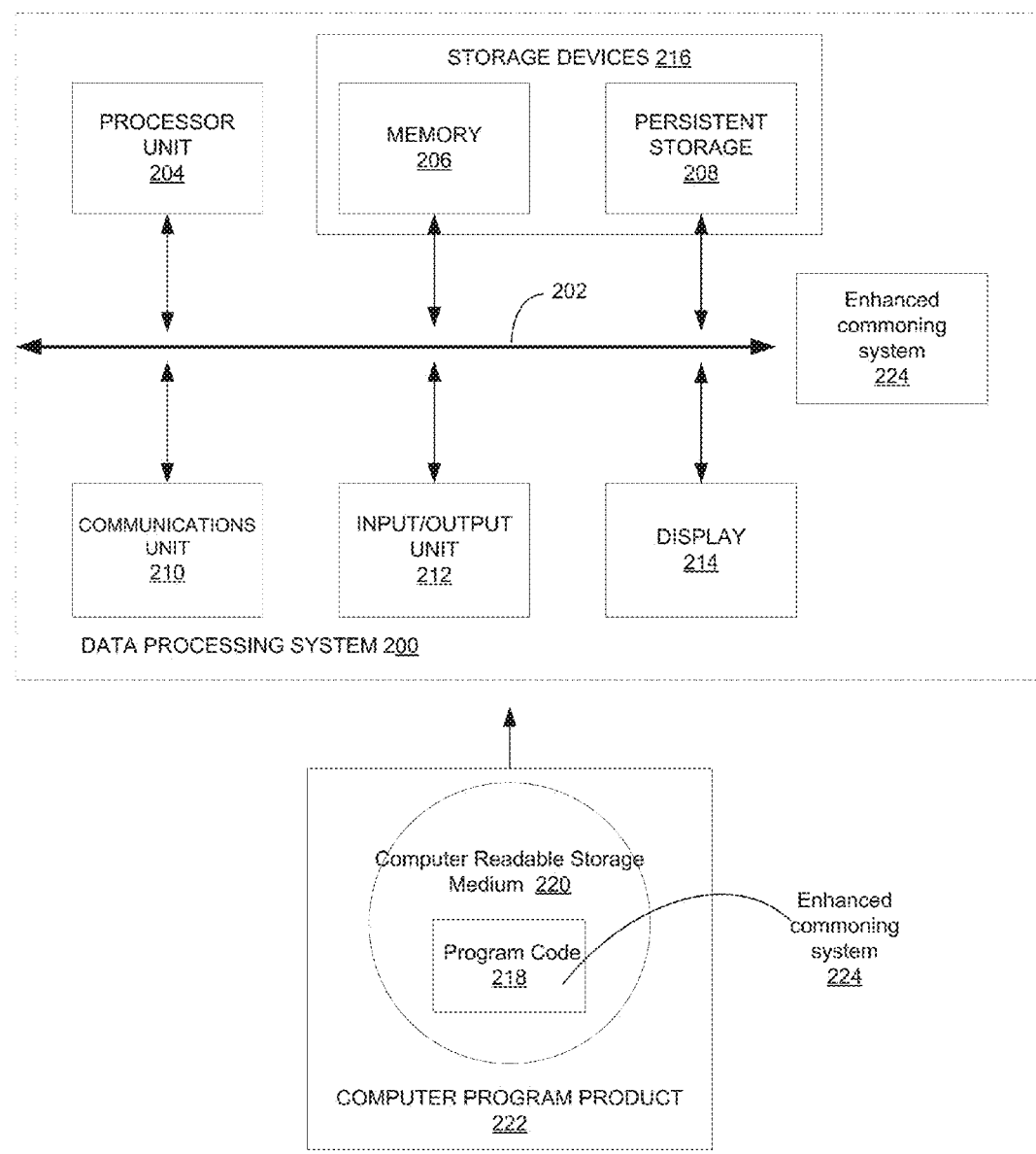
FIG. 2 depicts a block diagram of an exemplary data processing system comprising an enhanced local commoning system, in accordance with embodiments of the present invention.

FIG. 2 depicts a block diagram of an exemplary data processing system 200, in accordance with embodiments of the present invention. Data processing system 200 includes communications fabric 202, which is a communications interface that provides communications among processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is a hardware device that is capable of storing information, such as, for example without limitation, data, program code in functional form, and/or other suitable information either on a temporary basis and/or a permanent basis. Memory 206, in these examples, may be, for example, a random access memory (RAM), a read only memory (ROM), or any other suitable volatile or non-volatile hardware storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in one embodiment, provides for communications with other data processing systems or devices. In one embodiment, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media or a computer readable data storage device. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples.

In some illustrative embodiments, program code 218 may be downloaded over a network to persistent storage 208 from another device or data processing system for use within data processing system 200. For instance, program code stored in a computer readable data storage device in a server data processing system may be downloaded over a network from the server to data processing system 200. The data processing system providing program code 218 may be a server computer, a client computer, or some other device capable of storing and transmitting program code 218.

Enhanced commoning system 224 is an example of enhanced commoning system 116 of FIG. 1, Enhanced commoning system 224 using an enhanced compiler in a Java virtual machine environment provides optimization capabilities according to an embodiment of the present invention. Enhanced commoning system 224 may be stored in one form as program code 218 available on computer readable storage media 220 or within a memory 206 or persistent storage 208 of data processing system 200.

Using data processing system 200 of FIG. 2 as an example, a computer-implemented process for enhanced local commoning optimization. Processor unit 204 performs commoning of volatiles within an "extended block", which is an abbreviation for "extended basic block", for a particular memory model associated with a particular programming language, using a two-pass approach. Processor unit 204 determines within a first pass where to evaluate volatile expressions that can be commoned. Processor unit 204 commons all remaining expressions that are not volatile expressions, in a second pass.

Figure 3:
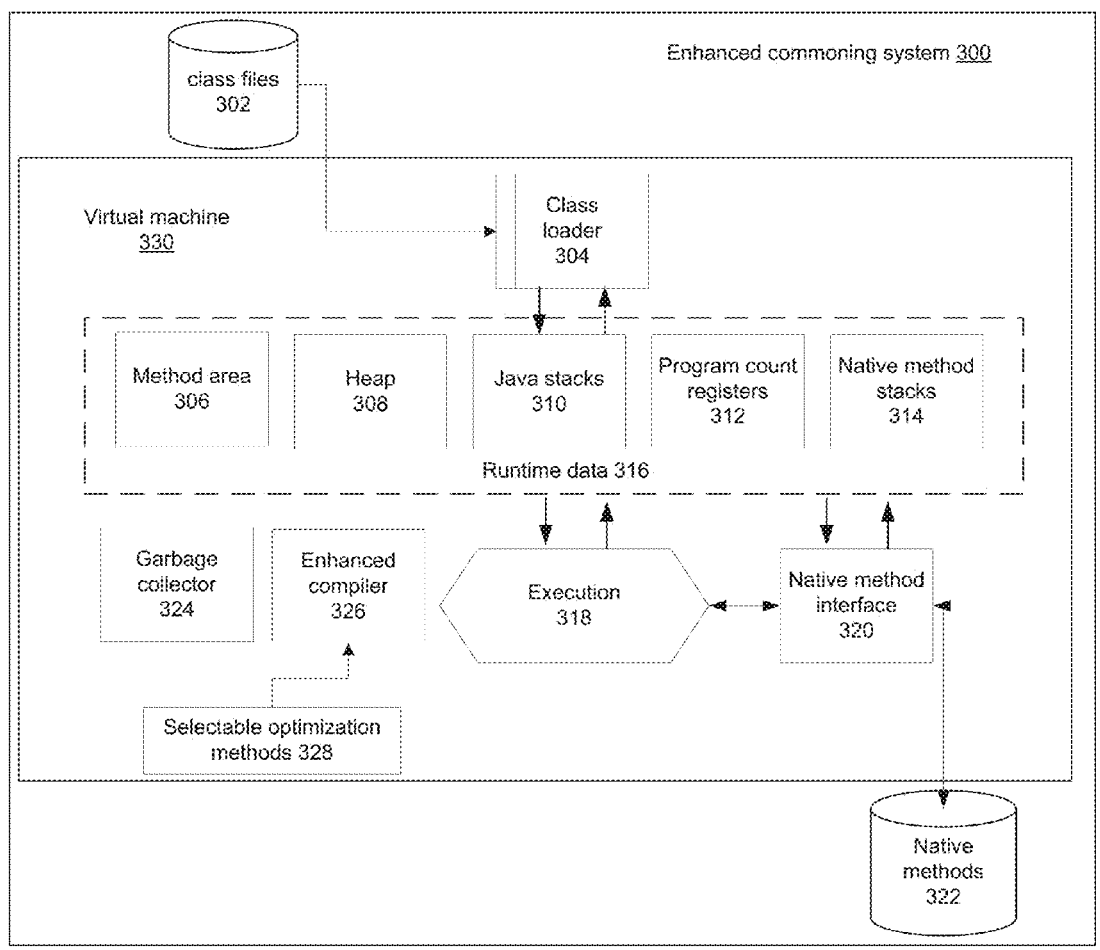
FIG. 3 depicts a block diagram representation of an enhanced commoning system, in accordance with embodiments of the present invention.

FIG. 3 depicts a block diagram of an enhanced commoning system 300, in accordance with embodiments of the present invention. Enhanced commoning system 300 is an example of an enhanced virtual machine environment in this example using an enhanced compiler 326 in a Java virtual machine 330 environment within a data processing system 200 of FIG. 2, according to an embodiment of the present invention. Enhancements incorporate technical features typically enabling more opportunity for optimization of Java programs.

Components of enhanced commoning system 300, include, but are not limited to class loader 304, method area 306, heap 308, Java stacks 310, program count registers 312, native stacks 314, runtime data 316, execution 318, native method interfaces 320, garbage collector 324, enhanced compiler 326 and selectable optimization methods 328. Class files 302 and native methods 322, are data structures used in conjunction with a Java virtual machine, but are not 'within' Java virtual machine 330 as are the previously stated components. These previously stated components represent subsystems and memory areas of a typical Java virtual machine.

Class loader 304 is a component of a Java virtual machine environment that provides a mechanism for loading the types, which are classes and interfaces, using fully qualified names. Class files 302 are therefore loaded into enhanced compilation system 300 for processing using class loader 304.

Runtime data 316 represents space in memory used to store data comprising, inter alia, bytecodes, information extracted from previously loaded class files, objects instantiated by an executing program, parameters provided to methods, return values associated with executing programs, and local variables associated with executing programs. Enhanced commoning system 300 may organize memory used to execute programs into a number of runtime data areas comprising method area 306, heap 308, Java stacks 310, program count registers 312, and native stacks 314.

Method area 306 represents a memory area that is shared by all threads running inside Java virtual machine 330. When Java virtual machine 330 loads a particular class file, the particular class file is parsed for information about a type from the binary data contained within the class file. The type information is loaded into method area 306. During program execution, Java virtual machine 330 stores all program instantiated objects onto heap 308.

Program counter registers 312, and Java stacks 310 are assigned to a new thread when the new thread is created. When the thread is executing a Java method, rather than a 'native method,' a value of program counter registers 312 is the next instruction for the thread to execute. Java stacks 310 store the state of Java method invocations, but not the 'native method,' invocations for the thread. The state of a Java method invocation typically includes local variables, invocation parameters, a return value when available and any intermediate calculation results from the method. Because a Java virtual machine does not have registers to hold data values as intermediate data, Java stacks 310 are used. The state of 'native method' invocations is stored in an implementation-dependent way in native stacks 314, and implementation-dependent memory areas.

Execution 318 represents an execution component or processing component that provides a capability for executing the instructions contained in the methods of classes, loaded by class loader 304.

Native method interfaces 320, provide a capability to Java virtual machine 330 to use native methods 322 which are written using a Java programming language and may have platform specific data or processing requirements. Access to the native methods 322 therefore requires use of native method interfaces 320 to enable processing using execution 318.

Garbage collector 324 is special component, which uses a process of reviewing current allocations of heap memory. Garbage collector 324 identifies which particular objects in the heap memory are in use and which particular objects in the heap memory are not in use. Objects identified as not in use are candidates for removal. Garbage collector 324 deletes the unused objects. Garbage collector 324 typically operates on a predetermined schedule or may also be automated to initiate cleaning activity when heap usage exceeds a predetermined threshold. Objects identified as in use or referenced imply that a program still maintains a pointer to that object, and the object should remain in the heap.

Enhanced compiler 326 is a runtime component providing a capability of dynamic translation, which is compilation during execution of a program rather than prior to the execution. Typically enhanced compiler 326 is a just-in-time compiler (JIT) that translates the Java bytecode to platform specific machine code. The run time compilation may be viewed as a combination of ahead-of-time compilation (AOT), and interpretation. JIT compilation provides speed of compiled code with flexibility of an interpretation. However JIT compilers also come with overhead of using the interpreter and additional overhead of compiling.

Selectable optimization methods 328 comprises a set of predetermined technologies for transforming program code input from a 'basic' form into a corresponding better performing variation of the 'basic' form. For example, a selected type of processing including local commoning optimizations is selected and applied to transform the 'basic' form. The technologies are typically expressed in predefined algorithms implemented within or as extensions to enhanced compiler 326.

For embodiments of the present invention, volatile fields may be referred to as a volatile, volatile variables, volatile keywords, or volatiles interchangeably without any loss in meaning. Volatile fields are special fields, which are used for communicating state information between threads. Each read of a particular volatile will see the last write to that particular volatile by any thread, in effect, the volatiles are designated by a programmer as fields for which seeing a "stale" value as a result of caching or reordering is unacceptable. The compiler and runtime are also prohibited from allocating volatiles in registers. When using volatiles, a programmer must also ensure that after the volatiles are written, the volatiles are flushed out of the cache to main memory, so the volatiles can immediately become visible to other threads. Similarly, before a volatile field is read, the cache must be invalidated so that the value in main memory, and not the value in the local processor cache, is the value seen. There are also additional restrictions on reordering accesses to volatile variables. A volatile variable's value is modifiable by different threads, whereas a non-volatile variable is not modifiable by different threads. A volatile expression is defined as an expression that includes or references a volatile variable. A non-volatile expression is defined as an expression that is not a volatile expression. Thus a non-volatile expression does not include or reference a volatile variable.

Under an old memory model, (prior to Java specification 1.5) accesses to volatile variables could not be reordered with respect to each other, but the volatile variables could be reordered with nonvolatile variable accesses. This however undermined the practical utility of volatile fields as a means of reliably signaling conditions from one thread to another.

Under a new memory model, the new Java Memory Model (JMM) specified by Java Specification Request (JSR)-133 volatile variables still cannot be reordered relative to one another. However there is a difference when using the new memory model, in that reordering normal field accesses around the volatile variables is not as easy as before using the old memory model. Writing to a volatile field has the same memory effect as a monitor release, while reading from a volatile field has the same memory effect as a monitor acquire. Because the new memory model places more strict constraints on reordering of volatile field accesses with respect to other field accesses, volatile or not, anything that was visible to thread A when thread A writes to volatile field f becomes visible to thread B when thread B reads volatile field f.

FIG. 4 depicts a textual representation of a code snippet of a program, in accordance with embodiments of the present invention. The operation of an embodiment of the invention is most easily conveyed using a small example program. Code snippet 400 is an example program of how volatile fields can be used.

Using the example of code snippet 400, assume one thread is calling writer 402, and another thread is calling reader 404. The write to v in writer 402 releases the write to x to memory, and the read of v acquires the value of v from memory. Thus, if reader 404 sees the value true for v, it is also guaranteed to see the write to 42 that happened before. This would not have been true under the old memory model. If v were not volatile, then the compiler could reorder the writes in writer 402, and a read of x by reader 404 might see 0. Using the new memory model, the semantics of volatile have been strengthened substantially, almost to the level of synchronization. Each read or write of a volatile field now acts like "half" synchronization, for purposes of visibility.

An important point to note is that both threads need to access the same volatile variable in order to properly set up a happens-before relationship. It is not the case that everything visible to thread A when thread A writes volatile field f becomes visible to thread B after thread B reads volatile field f. The release and acquire have to "match," so as to be performed on the same volatile field to have the correct semantics.

Figure 5:
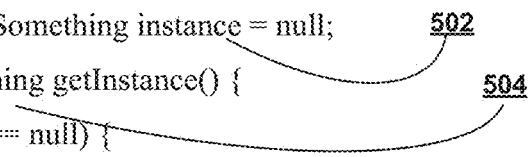
FIG. 5 depicts a textual representation of a code snippet of a program, in accordance with embodiments of the present invention.

FIG. 5 depicts a textual representation of a code snippet of a program, in accordance with embodiments of the present invention. The operation of an embodiment of the invention is most easily conveyed using a small example program. Code snippet 500 is an example program of a typical double-checked locking idiom, also referred to as a multithreaded singleton pattern, which is a programming technique designed to support lazy initialization while avoiding the overhead of synchronization. In very early Java virtual machine (JVM) implementations of the Java specification, synchronization was slow, and developers were eager to remove synchronization to improve performance. The double-checked locking idiom may be expressed in code snippet 500 as follows:

Code snippet 500 may appear to be an example of a clever technique because the synchronization is avoided on the common code path. However a problem with the example is that it does not work. The example fails at least because the writes which initialize instance 502 and the write to the instance field can be reordered by the compiler or the cache, which would have the effect of returning what appears to be a partially constructed Something. The result would be a read of an uninitialized object. There is no way to fix the example using the old Java memory model.

Many developers typically assumed that the use of the volatile keyword (i.e., volatile variable) would eliminate the problems that arise when trying to use the double-checked-locking pattern. In implementations of version of JVM prior to Java specification version 1.5, there was no assurance that volatile would function correctly. Using the new memory model of the more current specifications, enable the instance 502 field volatile will resolve the problems with double-checked locking, because there will be a happens-before relationship between the initialization of the Something 504 by the constructing thread and the return of a respective value by the thread that reads Something 504.

FIG. 6 depicts a textual representation of a code snippet of a program, in accordance with embodiments of the present invention. The operation of an embodiment of the invention is most easily conveyed using a small example program. In code snippet 600, instead of using the double-checked-locking, an implementation uses an Initialization On Demand Holder idiom, which is thread-safe and easier to understand.

The code in the example of code snippet 600 is "guaranteed" to be correct because of the initialization guarantees applicable to static fields. Therefore, when a field is set in a static initializer, the field is "guaranteed" to be made visible correctly, to any thread that accesses that class.

Because concurrency bugs are very difficult to debug, developers are advised to spend the extra effort ahead of time to ensure that a program is properly synchronized. While the upfront effort is nontrivial, the effort is typically easier than trying to debug a badly synchronized application.

A volatile load is defined as a load of a value of a volatile variable into a register. Similarly, a non-volatile load is defined as a load of a value of a non-volatile variable into a register.

Prior to an implementation of an embodiment of the present invention, there was no local commoning of volatile fields allowed. Furthermore, there was no local commoning of any non-volatile fields across a volatile field access. Essentially volatile field loads acted as kill points for non-volatile field loads in local commoning and volatile loads were ineligible for commoning.

Embodiments of the present invention attempt to list the constraints under which an implementation is allowed to perform commoning of a) volatile variable loads and b) predetermined kinds of non-volatile variable loads across volatile variable loads. In an example embodiment of the present invention, a two-pass enhancement is used to perform local commoning that improves the compiler generated code while still maintaining functional correctness with respect to volatile accesses as per the current Java specification.

A typical standard compiler optimization is a technique of local commoning of variables in the program being compiled. Local commoning of variables are defined as follows. With local commoning of a variable, the compiler aims to reuse a previously computed value of the variable that was loaded into a register instead of performing the computation again within the scope of an extended basic block (an extended basic block is a sequence of contiguous instructions that, unlike basic blocks, may contain jumps). This reuse of the previously computed value of the variable can only be done when the register being reused contains the same value as would have been produced if the variable had been queried. In addition to the usual constraints, including checking for kills, that must be checked to perform local commoning for non-volatile variables, there are additional constraints that must also be checked to common volatile variables. Embodiments of the present invention attempt to list the constraints under which commoning of a) volatile variable loads and b) predetermined kinds of non-volatile variable loads across volatile variable loads can be performed.

Commoning a volatile expression is defined as commoning a volatile variable that is included in, or referenced by, the volatile expression.

An embodiment of the present invention begins by identifying a set of scenarios in which it could be possible to common a volatile load without the user being able to detect that the compiler has done so without violating the current Java specification. A trivial example may be: when the same volatile field was loaded twice in succession with no intervening memory accesses, then commoning of the load is valid in this situation. Since local commoning is only being done at the scope of an extended basic block, this still means that a load of the volatile field happens from memory every time the extended basic block is executed. For example, flow of control will not proceed indefinitely without doing a load of the volatile field in question since a single extended basic block cannot contain a loop. The current Java specification is not violated by performing this type of commoning of back to back loads because of a possibility that the memory subsystem on the machine may not have transmitted the result of a store done to the volatile field on a second logical thread in time for the thread to pick up a different value when the second of the back to back loads is executed. To generalize this point, any two volatile loads that only have memory accesses to local variables or immutable final fields (or no memory accesses at all) in the code between the volatile loads may be candidates to common, because neither local variables nor immutable final fields (that are only written once when the field gets initialized) can be updated in a manner that has any correlation with the update of any volatile field. For example, loads from local variables are acceptable because these loads do not involve global variables, and immutable final fields are acceptable because the immutable final fields cannot be written twice.

When it is possible to common volatile loads in the cases identified above, then a volatile load that was being done later in the extended basic block would be eliminated, which in turn would allow commoning of non-volatile fields across some program points in the code where the volatile load would have acted as a barrier for commoning.

Figure 7:
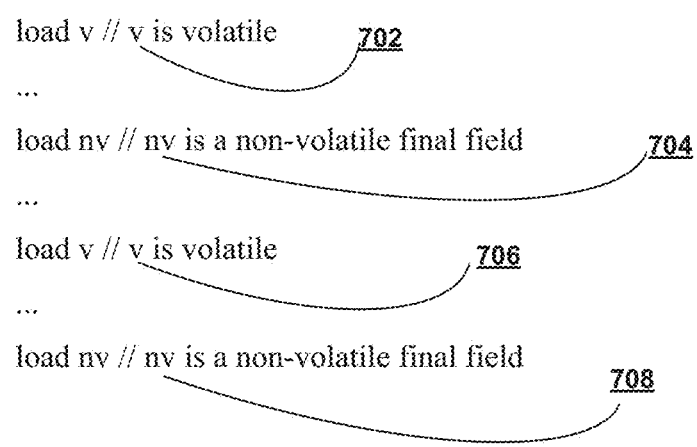
FIG. 7 depicts a textual representation of a code snippet of a program, in accordance with embodiments of the present invention.

FIG. 7 depicts a textual representation of a code snippet of a program, in accordance with embodiments of the present invention. The operation of an embodiment of the invention is most easily conveyed using a small example program. Code snippet 700 is an example in which neither field can be commoned.

Using an embodiment of the present invention, local commoning can eliminate the second load of v 706 since the only memory access between the first load of v 702 and the second load of v 706 is a final field load nv 704. Once the second load of the volatile v 706 is eliminated, commoning of the field nv 704 is allowed to occur as well because there is no longer a kill point between the first load of nv 704 and the second load of nv 708.

Implementation of an embodiment of the present invention changes the one pass approach followed by existing local commoning optimizations. Instead a two pass approach is used in which each extended basic block is would be analyzed once to common all volatile loads first and then once again to common all the non-volatile expressions. The first pass a) tracks opportunities for commoning local variables and final fields in addition to b) tracking opportunities to common volatile fields. A difference in handling the two kinds of opportunities is evident in the first pass because only the volatile fields actually get commoned and local variables and final fields are not actually commoned in this first pass. The reason for taking this approach can be clarified by using a different example than that of FIG. 7.

Figure 8:
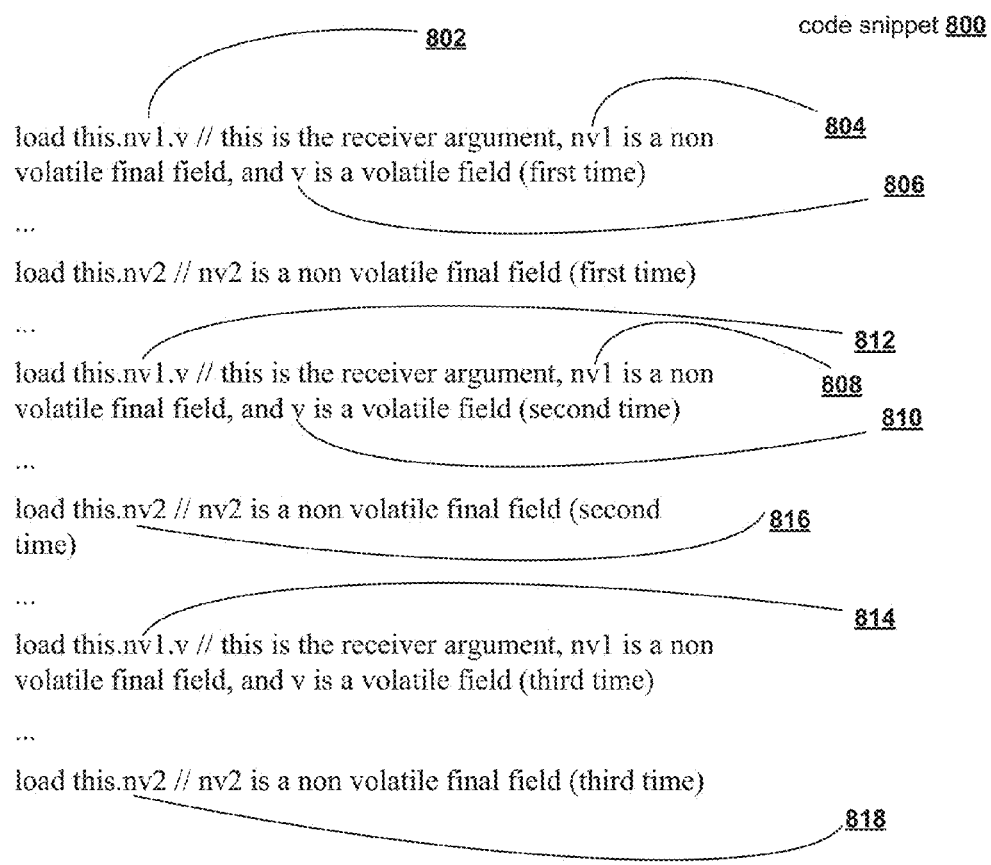
FIG. 8 is a textual representation of a code snippet of a program, in accordance with embodiments of the present invention.

FIG. 8 depicts a textual representation of a code snippet of a program in accordance with embodiments of the present invention. The operation of an embodiment of the invention is most easily conveyed using a small example program. Code snippet 800 is an example of commoning two volatile field loads.

In this example, a capability to common the two volatile field loads is desired, but note that to do so there is a need to common the loads of this.nvl 802 first. Naively speaking, the loads of this.nvl cannot be commoned because there is a load of a volatile field v 806 in between the first load of nvl 804 and a second load of nvl 808 (note that there is a second load of volatile field vi 810). To solve this problem, in an embodiment of the present invention, a first pass of local commoning tracks all expressions that would have been commoned, including this.nvl 802 if not for the "last volatile access" in particular the first load of this.nvl.v 802, without actually performing the commoning. The embodiment of the present invention collects and uses this information to common up the second load of this.nvl.v 812 with the previous volatile access, which also happens to be dependent on the same chain of indirect accesses. Similar logic leads to the commoning of the third load of the volatile this.nvl.v 814 in the first pass without any other expressions commoned in the third pass. Note that no other volatile load is available for commoning apart from the "last volatile access" at any program point. For example, if modulo the volatile accesses that were commoned and therefore are eliminated, only one volatile load expression is available for commoning at any point.

The second pass of local commoning proceeds and commons all expressions except volatile loads. In the current example in FIG. 8, since there is only a single load of the volatile field in the extended basic block, later loads of non-volatile fields can be commoned. For example, a third load of this.nv2 818 can be commoned with the second load of this.nv2 816 because there is no load of any volatile in between. A set of rules followed in this second pass are very similar to what local commoning would have done originally, (i.e. without the technique of the present invention) with one notable change, namely that no volatile variables are commoned in the second pass.

The two-pass approach to local commoning, as currently described, typically achieves more commoning of volatile accesses and creates additional opportunities for non-volatile commoning than other optimizations which creates opportunities for more commoning of non-volatile accesses as well.

Figure 9:
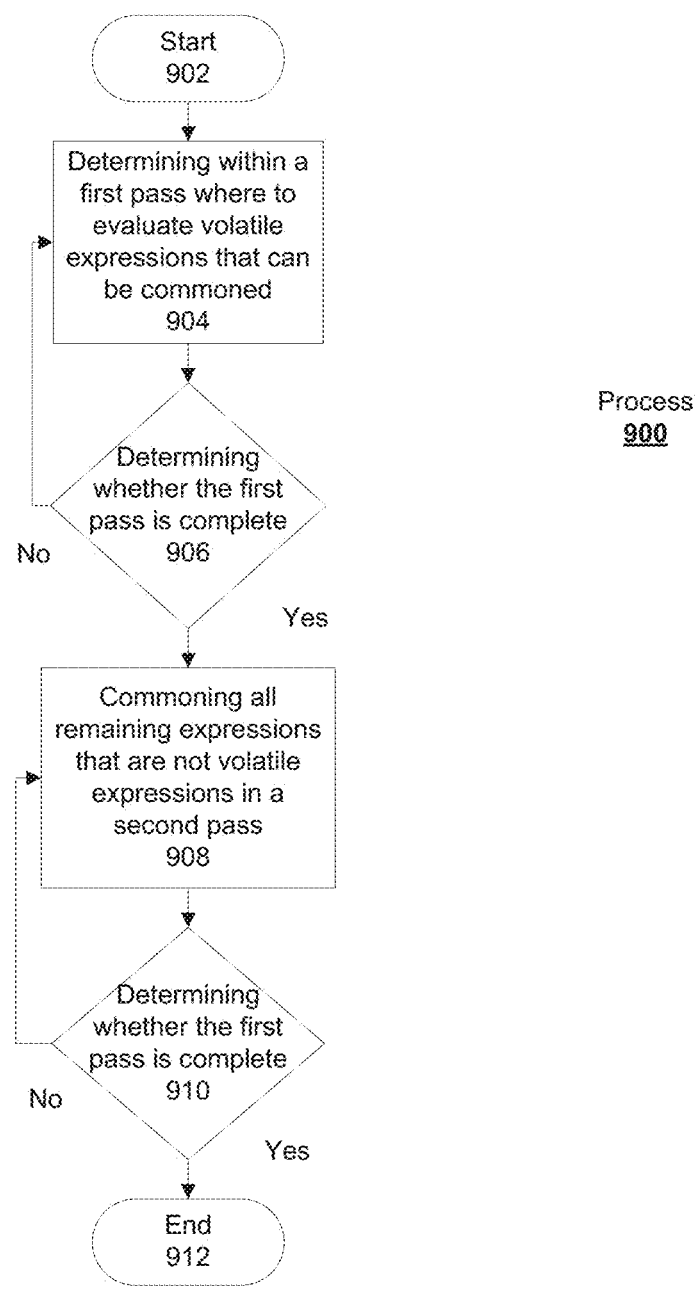
FIG. 9 is a flowchart of a process for enhanced local commoning optimization, in accordance with embodiments of the present invention.

FIG. 9 a flow chart of a process (i.e., method) 900 for enhanced local commoning optimization, in accordance with embodiments of the present invention. Process 900 is a high level view of an embodiment of the enhanced commoning system 300 of FIG. 3.

Process 900 is a computer-implemented process for enhanced local commoning optimization. Process 900 may be implemented as applied to compiling a program, using a particular memory model associated with a particular programming language selected from the group consisting of a managed runtime language, a scripting environment language, and a procedural language.

Process 900 begins (step 902) and performs the computer-implemented process of performing commoning of volatiles within an extended block for a particular memory model associated with the particular programming language, using a two pass approach. Process 900 determines within a first pass where in the program to evaluate volatile expressions that can be commoned (step 904 which is described in FIG. 10). Process 900 further determines whether the first pass is complete (step 906). In response to a determination that the first pass is not complete, process 900 returns to step 904 to process remaining volatile expressions that can be commoned, as before.

Figure 11:
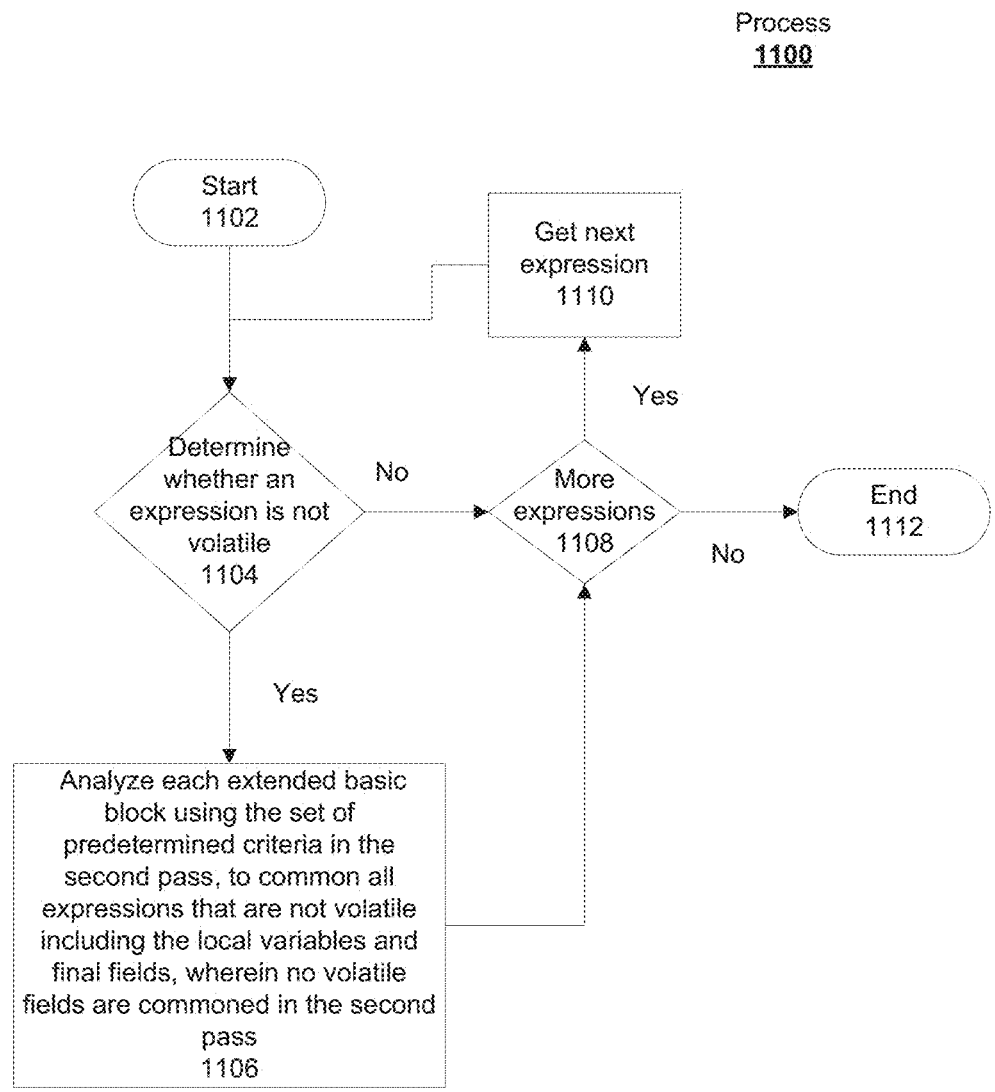
FIG. 11 is a flowchart of a process for another step in the flowchart of FIG. 9, in accordance with embodiments of the present invention.

In response to a determination that the first pass is complete, process 900 performs commoning, in a second pass, all remaining expressions that are not volatile expressions (step 908 which is described in FIG. 11). Process 900 further determines whether the second pass is complete (step 910). In response to a determination that the second pass is not complete, process 900 returns to step 908 to process remaining expressions that are not volatile, as before. In response to a determination that the second pass is complete, process 900 ends (step 912).

Figure 10:
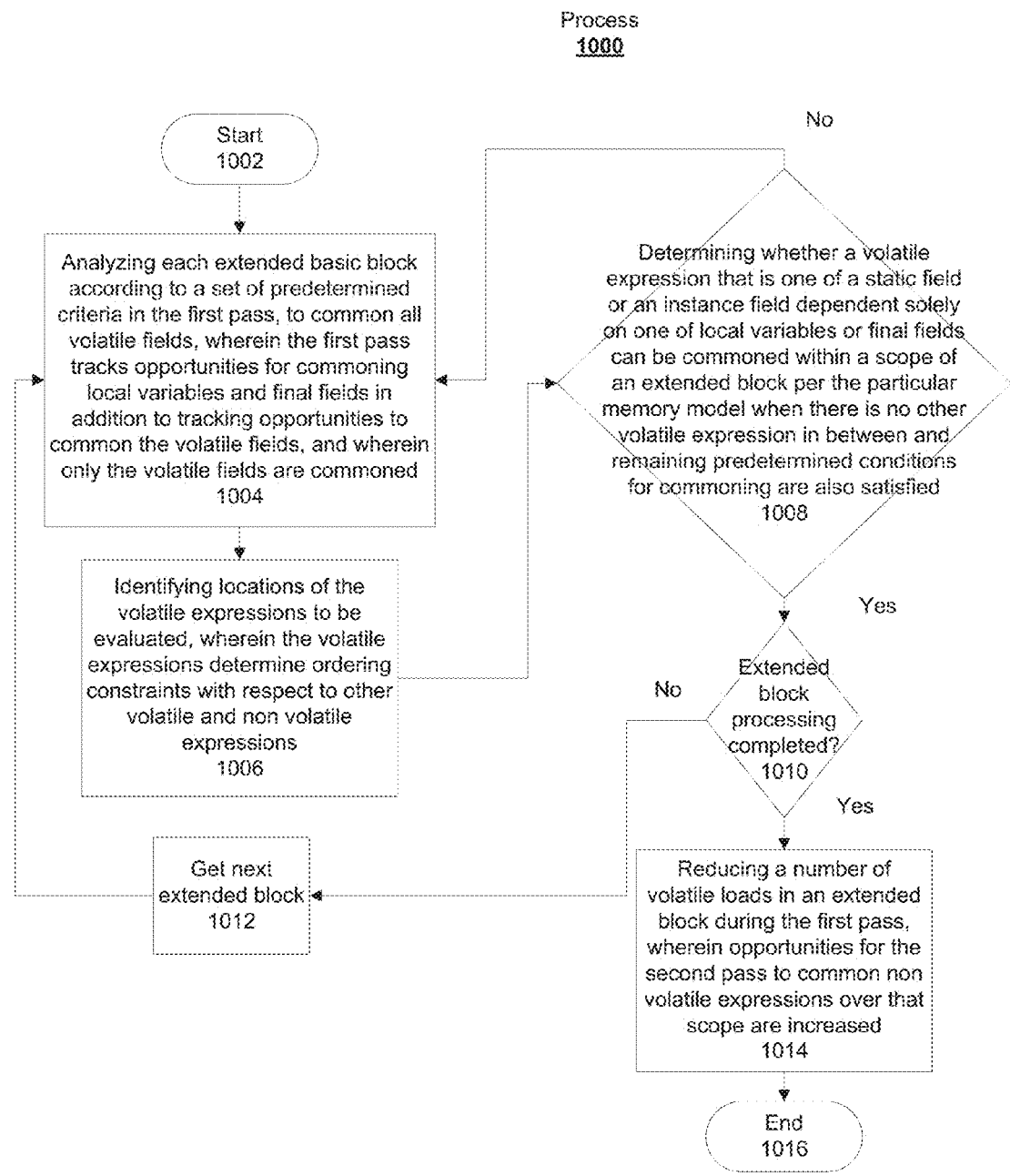
FIG. 10 is a flowchart of a process for a step in the flowchart of FIG. 9, in accordance with embodiments of the present invention.

FIG. 10 is a flow chart of a process 1000 for step 904 in the flowchart of FIG. 9, in accordance with embodiments of the present invention. Process 1000 is a further view of determining within the first pass where in the program to evaluate volatile expressions that can be commoned of step 904 of FIG. 9.

Process 1000 begins (step 1002) and analyzes each extended basic block according to a set of predetermined criteria in the first pass, to common all volatile fields, wherein the first pass tracks opportunities for commoning local variables and final fields in addition to tracking opportunities to common the volatile fields, and wherein only the volatile fields are commoned in the first pass (step 1004). Process 1000 identifies locations, in the program, of the volatile expressions to be evaluated, wherein the volatile expressions determine ordering constraints with respect to other volatile and non-volatile expressions (step 1006).

Process 1000 determines whether a volatile expression that is one of a static field or an instance field dependent solely on local variables or final fields that can be commoned within a scope of an extended block per the particular memory model when there is no other volatile expression in between and remaining predetermined conditions for commoning are also satisfied (step 1008). In response to a determination that conditions for commoning are not satisfied, process 1000 returns to step 1004 for processing as before.

In response to a determination that conditions for commoning are satisfied, process 1000, process determines whether extended block processing is completed (step 1010). In response to a determination that extended block processing is not completed, process 1000 moves to get next extended block (step 1012), followed by moving to step 1004 for processing as before.

In response to a determination that extended block processing is completed, process 1000 reduces a number of volatile loads in an extended block during the first pass, wherein opportunities for the second pass to common non-volatile expressions over that scope are increased (step 1014) and terminates thereafter (step 1016).

FIG. 11 a flow chart of a process 1100 for step 908 in the flowchart of FIG. 9, in accordance with embodiments of the present invention. Process 1100 is a further view of commoning all remaining expressions that are not volatile expressions in the second pass further of step 908 of FIG. 9.

Process 1100 begins, (step 1102) and determines whether an expression is not volatile (step 1104). In response to a determination that an expression is not volatile, process 1100 analyzes each extended basic block using the set of predetermined criteria in the second pass, to common all expressions that are not volatile including the local variables and final fields, wherein no volatile fields are commoned in the second pass (step 1106). Process 1100 determines whether there are more expressions (step 1108).

In response to a determination that an expression is volatile, process 1100 determines whether there are more expressions (step 1108). In response to a determination that there are more expressions, process 1100 gets a next expression (step 1110) and returns to step 1104 for processing as before. In response to a determination that there are no more expressions, process 1100 terminates (step 1112).

A subtle point of embodiments of the present invention is an insight that any volatile expression that is a static field or is an instance field dependent solely on local variables or final fields can be commoned within a scope of an extended block legally as per a memory model when there is no other volatile expression in between and the other conditions for commoning are also satisfied. Using an embodiment of the present invention maintains compliance with the Java specification while commoning those specific kinds of volatile expressions.

During the first pass using an embodiment of the present invention, commoning only volatile expressions reduces a number of volatile loads in the extended block thereby increasing opportunities for a later pass to common non-volatile expressions over that scope. Because the volatile expressions determine the ordering constraints with respect to other volatile and non-volatile expressions, identifying where the volatile expressions would be evaluated is performed before other communing is performed.

Because memory models vary by programming language, rules for which kinds of volatile accesses might be permitted to common within an extended block could also vary. Despite those differences, embodiments of the present invention could still be viewed as a general description of how to achieve the commoning of volatiles within an extended block. For example, a two pass approach may be used, wherein the first pass determines where to evaluate the volatile expressions that can be commoned and the second pass performs commoning of remaining expressions that are not volatile expressions.

Thus is presented, in an illustrative embodiment, a computer-implemented process for enhanced local commoning optimization. The computer-implemented process comprises performing commoning of volatiles within an extended block for a particular memory model associated with a particular programming language, using a two-pass approach. A first pass determines where to evaluate volatile expressions that can be commoned. A second pass commons all remaining expressions that are not volatile expressions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage device having computer executable instructions stored thereon in a variety of forms. Examples of computer readable data storage devices include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include one or more processors coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

A computer program product of the present invention comprises one or more computer readable hardware storage devices having computer readable program instructions stored therein, said program instructions executable by one or more processors to implement the methods of the present invention.

A computer system of the present invention comprises one or more processors, one or more memories, and one or more computer readable hardware storage devices, said one or more hardware storage device containing program instructions executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for enhanced local commoning optimization of compilation of a program, said method comprising:
   performing, by one or more processors of a computer system, commoning of volatiles within an extended block for a particular memory model associated with a particular programming language, using a two pass approach by:
      determining, by the one or more processors, within a first pass, where in the program to evaluate volatile expressions that can be commoned; and
      commoning, by the one or more processors, in a second pass, all remaining expressions that are not volatile expressions.

2. The method of claim 1, wherein said determining within the first pass where in the program to evaluate volatile expressions that can be commoned comprises:
   analyzing each extended basic block in the program according to a set of predetermined criteria in the first pass, to common all volatile fields, wherein the first pass tracks opportunities for commoning local variables and final fields in addition to tracking opportunities to common the volatile fields, and wherein only the volatile fields are commoned in the first pass.

3. The method of claim 2, wherein said analyzing each extended basic block according to the set of predetermined criteria in the first pass comprises:
   identifying locations in the program of the volatile expressions to be evaluated, wherein the volatile expressions determine ordering constraints with respect to other volatile and non-volatile expressions; and
   reducing a number of volatile loads in an extended basic block in the program during the first pass, which increases opportunities for the second pass to common non-volatile expressions over a scope of the extended basic block.

4. The method of claim 1, wherein said commoning all remaining expressions that are not volatile expressions in the second pass comprises:
   analyzing each extended basic block in the program using the set of predetermined criteria in the second pass, to common all expressions that are not volatile including local variables and final fields, wherein no volatile fields are commoned in the second pass.

5. The method of claim 1, wherein a volatile expression that is a static field or an instance field dependent solely on local variables or final fields can be commoned within a scope of an extended block per the particular memory model when (i) there is no other volatile expression in between and (ii) remaining predetermined conditions for commoning are also satisfied.

6. The method of claim 1, wherein the particular memory model associated with the particular programming language is selected from a group consisting of a managed runtime language, a scripting environment language, and a procedural language.

7. A computer program product, comprising one or more computer readable hardware storage devices having computer readable program instructions stored therein, said program instructions executable by one or more processors of a computer system to implement a method for enhanced local commoning optimization of compilation of a program, said method comprising:
   performing, by the one or more processors, commoning of volatiles within an extended block for a particular memory model associated with a particular programming language, using a two pass approach by:
      determining, by the one or more processors, within a first pass, where in the program to evaluate volatile expressions that can be commoned; and
      commoning, by the one or more processors, in a second pass, all remaining expressions that are not volatile expressions.

8. The computer program product of claim 7, wherein said determining within the first pass where in the program to evaluate volatile expressions that can be commoned comprises:
   analyzing each extended basic block in the program according to a set of predetermined criteria in the first pass, to common all volatile fields, wherein the first pass tracks opportunities for commoning local variables and final fields in addition to tracking opportunities to common the volatile fields, and wherein only the volatile fields are commoned in the first pass.

9. The computer program product of claim 8, wherein said analyzing each extended basic block according to the set of predetermined criteria in the first pass comprises:
   identifying locations in the program of the volatile expressions to be evaluated, wherein the volatile expressions determine ordering constraints with respect to other volatile and non-volatile expressions; and
   reducing a number of volatile loads in an extended basic block in the program during the first pass, which increases opportunities for the second pass to common non-volatile expressions over a scope of the extended basic block.

10. The computer program product of claim 7, wherein said commoning all remaining expressions that are not volatile expressions in the second pass comprises:
   analyzing each extended basic block in the program using the set of predetermined criteria in the second pass, to common all expressions that are not volatile including local variables and final fields, wherein no volatile fields are commoned in the second pass.

11. The computer program product of claim 7, wherein a volatile expression that is a static field or an instance field dependent solely on local variables or final fields can be commoned within a scope of an extended block per the particular memory model when (i) there is no other volatile expression in between and (ii) remaining predetermined conditions for commoning are also satisfied.

12. The computer program product of claim 7, wherein the particular memory model associated with the particular programming language is selected from a group consisting of a managed runtime language, a scripting environment language, and a procedural language.

13. A computer system, comprising one or more processors, one or more memories, and one or more computer readable hardware storage devices, said one or more hardware storage device containing program instructions executable by the one or more processors via the one or more memories to implement a method for enhanced local commoning optimization of compilation of a program, said method comprising:
   performing, by the one or more processors, commoning of volatiles within an extended block for a particular memory model associated with a particular programming language, using a two pass approach by:
      determining, by the one or more processors, within a first pass, where in the program to evaluate volatile expressions that can be commoned; and
      commoning, by the one or more processors, in a second pass, all remaining expressions that are not volatile expressions.

14. The computer system of claim 13, wherein said determining within the first pass where in the program to evaluate volatile expressions that can be commoned comprises:
   analyzing each extended basic block in the program according to a set of predetermined criteria in the first pass, to common all volatile fields, wherein the first pass tracks opportunities for commoning local variables and final fields in addition to tracking opportunities to common the volatile fields, and wherein only the volatile fields are commoned in the first pass.

15. The computer system of claim 14, wherein said analyzing each extended basic block according to the set of predetermined criteria in the first pass comprises:
   identifying locations in the program of the volatile expressions to be evaluated, wherein the volatile expressions determine ordering constraints with respect to other volatile and non-volatile expressions; and
   reducing a number of volatile loads in an extended basic block in the program during the first pass, which increases opportunities for the second pass to common non-volatile expressions over a scope of the extended basic block.

16. The computer system of claim 13, wherein said commoning all remaining expressions that are not volatile expressions in the second pass comprises:
   analyzing each extended basic block in the program using the set of predetermined criteria in the second pass, to common all expressions that are not volatile including local variables and final fields, wherein no volatile fields are commoned in the second pass.

17. The computer system of claim 13, wherein a volatile expression that is a static field or an instance field dependent solely on local variables or final fields can be commoned within a scope of an extended block per the particular memory model when (i) there is no other volatile expression in between and (ii) remaining predetermined conditions for commoning are also satisfied.

18. The computer system of claim 13, wherein the particular memory model associated with the particular programming language is selected from a group consisting of a managed runtime language, a scripting environment language, and a procedural language.

* * * * *